March 18, 1924.                                 1,487,297
                       O. URBASCH
                    HEATING APPLIANCE
                    Filed Feb. 3, 1922

Inventor
O. Urbasch,
By Warks & Clerk
   Attys.

Patented Mar. 18, 1924.

1,487,297

UNITED STATES PATENT OFFICE.

OTTOKAR URBASCH, OF VIENNA, AUSTRIA.

HEATING APPLIANCE.

Application filed February 3, 1922. Serial No. 533,946.

*To all whom it may concern:*

Be it known that I, Dr. OTTOKAR URBASCH, chemist, citizen of the Republic of Austria, residing at Vienna, in the Republic of Austria, have invented certain new and useful Improvements in and Relating to Heating Appliances, of which the following is a specification.

Producers for the production of heating gas have hitherto generally been made on a large scale and have been used in such a manner that the gas produced in them has been used for industrial purposes at a place separated from the producer, while hitherto they have not been used for domestic purposes.

The reason for their not being used was probably due to the fact that it was not to be expected that producers having small dimensions, for instance a shaft 80–200 mm. high and 60 mm. diameter, would give a satisfactory gas production and would produce effective flames for the purpose for which the apparatus is to be used at the orifice of the small producer shaft.

Nevertheless experiments have proved, that producers of very small dimensions may be employed with the best results as small cooking or heating apparatus, if they are operated with forced draught, which they produce themselves in the simplest manner. The present invention consists in using for heating and cooking purposes producers of very small dimensions, of about the size of the well known spirit or petroleum stoves, in which heating is effected directly by the flames or by burnt gases as they emerge from the producer.

Figure 1:
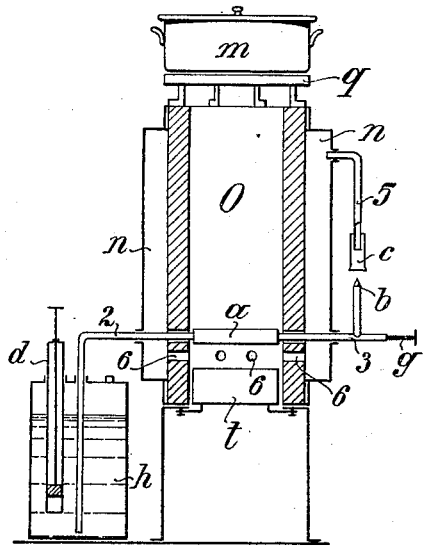
Figure 2:
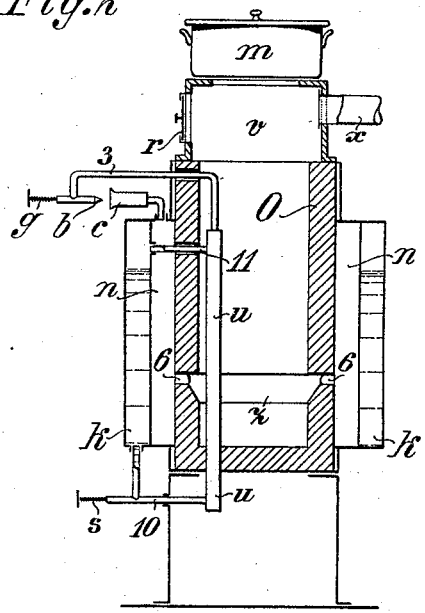
Figure 3:
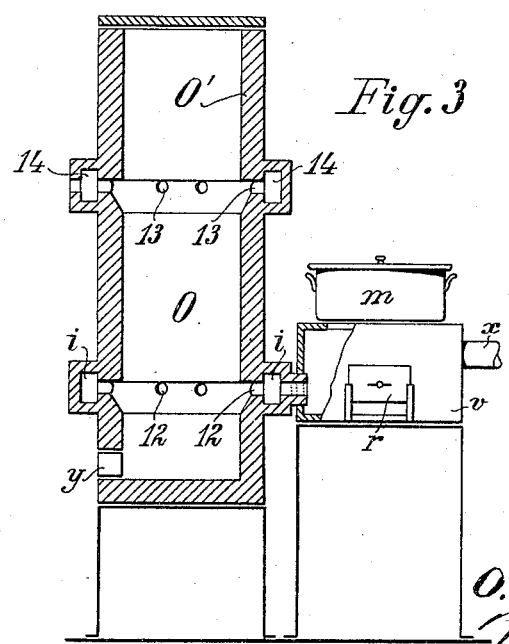

In the accompanying drawing, Fig. 1 is a vertical sectional view of one form of the invention. Fig. 2 is a similar view of a modification in which the products of combustion are conveyed away by a chimney. Fig. 3 is a similar view in which the gases from the producer are burned in a separate chamber arranged at one side of the producer.

These producers are operated with air supplied by artificial means, which is effected by the well known injector action of a jet of steam, to which the heating apparatus itself supplies the vaporizing heat.

The steam generator can be formed either by a small annular vessel surrounding the producer or by a system of pipes, which is either built into the producer or into a heating or waste gas flue.

In the constructional form shown in Fig. 1, the cooking and heating apparatus consists of a pipe O, having a height of about 100–150 mm. and a diameter of about 60 mm., made of fire resisting material and forming the small furnace chamber into which a hollow grate $a$ is built, under which an ash box $t$ is provided, which can be removed downwardly or laterally. The hollow grate $a$ communicates through pipe 2 with a water container $h$ adapted to be put under pressure by means of an air pump $d$ and with a pipe 3 terminating in the steam nozzle $b$, the internal cross-section of which may be varied by a valve $g$.

The tube O is surrounded by an annular chamber $n$, which communicates through ducts 6 with the ash pit $t$ and the top with a pipe 5, which end about the steam nozzle $b$ and is provided at that point with an adjustable mixing nozzle $c$. The cooking vessel $m$ rests in this constructional form on a supporting grid $g$ mounted above the shaft opening, so that the flames can emerge from the tube O, at the same time playing around the vessel $m$. For putting the producer cooker in operation, the small tube O is charged for instance with broken charcoal having a size of grain of about 8–10 mm., which for firing up and starting the development of steam is moistened with a small quantity of methylated spirit and ignited. On the vaporizer becoming sufficiently hot the water vessel $h$ is put under pressure by means of the air pump $d$, the valve being gradually opened and the producer is charged with charcoal or coke having a size of grain of about 8–12 mm.

The steam generated in the hollow grate $a$ passes to an amount regulated by the air pressure in the water container $h$ and the valve $g$ out of the nozzle $b$, carries air along with it, when passing into the mixing nozzle $c$, and flows into the box $n$, in which the mixture of steam and air is heated, and then passes through the ducts 6 into the ash pit and from there to the fuel. The mixture of steam and air, when in contact with the glowing fuel, forms carbonic oxide and hydrogen when the layer of fuel is about 100 mm. thick, these gases forming at the orifice of the shaft in the open air a heating flame, which can be used for cooking purposes like the ordinary methylated spirit and petroleum cookers. If the layer of fuel is about 40 mm. thick, the fuel is consumed without forming a flame, carbonic acid being generated.

If the products of combustion are conducted, as shown in Fig. 1, into the surrounding air, obviously fuel can be used which has been very well coked or has been brought twice to incandescence and freed from sulphur and the size of grain of which must be adapted to the dimensions of the small shaft. When using fuels which give off a bad odor or if the products of combustion are to be conveyed away, the constructional form shown in Fig. 2 should be chosen, in which the fire gases are conducted into a hood $v$ located above the tube O and communicating with the house chimney and on which the cooking vessels rest and which is provided with a regulable opening $r$ for the admission of secondary air. The constructional form shown in Fig. 2 and provided with the hood $v$ also differs from those described by having no grate. The water vapour is generated by a vertical pipe $u$ in the tube O, which is connected by pipes 10 and 11 at the bottom and the top with the annular water container $k$, which surrounds the mixing chamber $n$, the lower pipe 10 being provided with a valve $s$ for regulating the water supply. The water supply is effected by hydrostatic pressure, but the water vessel $k$ can be fitted as in the previous case with an air pump or be mounted at a suitable height above the vaporizer and be open. The steam generated in the pipe $u$ flows through the regulable nozzle $b$ and carries a quantity of the air with it, which may be varied by adjusting the mixing nozzle $c$. The mixture of steam and air thus generated is preheated in the chamber $n$ and flows through the ducts 6 into the tube O, which is provided at the orifices of these ducts with a circular recess $z$, which distributes the mixture and keeps the orifices free. The burning gases, emerging at the upper opening of the producer, are completely burnt by a supply of secondary air, heat the vessel, $m$ resting on the hood $v$ and escape through the pipe $x$ into the house chimney, after, for instance having given off their heat to a roasting oven, a heating oven and the like.

When using poor heating mediums that are badly coked or separate off crude tar, it is necessary to pass the products of distillation, before they are used, through layers of glowing fuel, so as to convert them into gases, which burn readily or without odor. For this purpose the mixture of steam and air, which produces the artificial draught, must be conducted in the dwarf producer from above in a downward direction. The gases produced in this case near the bottom of the producer form the heating flame at an exit opening provided at this point.

A constructional example of this kind, with the omission of the auxiliary means for generating the mixture of steam and air, which may be constructed as in Figs. 1 and 2, is shown in Fig. 3. The mixture of steam and air flows through the elevated annular duct 14 and the radial ducts 13 into the small producer O, passes downwardly through the column of fuel, the burning gases pass out at the orifices 12 near the bottom of the shaft into the collecting duct $i$ and thence into the box $v$, which communicates with the house chimney and is provided with openings $r$ for secondary air and on which the cooking vessels $m$ rest. For removing the slag, openings $y$, that are adapted to be closed, are provided at the bottom of the shaft pipe 0.

In place of the steam injector an air injector can be used. The heating arrangements described can be kept constantly glowing by reducing the artificial draught or by connecting them to the house chimney. When a heating flame is required the producer O is given an increased artificial draught.

The constructional form shown in Fig. 3 is especially adapted for a continuously burning producer for household use, as the upper part of the shaft is formed as a fuel container 0, from which the fuel sinks into the gasifying zone, as it is consumed there. This form also permits of the gasification being conducted upwardly just as in Figs. 1 and 2.

Through this invention the amounts of heat required for household purposes for heating and cooking can be generated in very small furnaces, which are particularly suitable for cooking purposes as the heating flames do not cause soot to be deposited on the cooking utensils. The dwarf producers can of course be used for other purposes and have the advantage that inferior fuels can be completely consumed in them.

Having now particularly described and ascertained the nature of my said invention and in what manner the same is to be performed, I declare that what I claim is:—

1. In heating apparatus especially for domestic purposes the combination of a relatively small gas producer, a closed water vessel with means for producing air pressure therein, a steam generator immediately heated by the gas producer, means for connecting said water vessel with the said steam generator, means for mixing the steam generated by the steam generator with air, means for conveying steam and aspirated air to the gas producer, a support adapted to carry a cooking vessel, and means for directing the gas created in said producer against said support, whereby the gas created in the producer may be burnt beneath said support.

2. A heating apparatus especially for domestic purposes comprising a relatively small gas producer, a closed water vessel with means for producing air pressure therein, a steam generator directly heated by the gas producer, means for connecting the said steam generator with said water vessel, a steam nozzle connected with the steam generator, an air aspirating nozzle surrounding said steam nozzle, and means including a closed chamber heated by the producer for preheating and conveying the mixture of steam and aspirated air into the gas producer.

3. A heating apparatus especially for domestic purposes, including a relatively small gas producer, a closed water vessel with means for producing air pressure therein, a steam generator directly heated by the gas producer, means for connecting the said steam generator with said water vessel, a steam nozzle connected with the steam generator, an air aspirating nozzle surrounding said steam nozzle, a steam chamber surrounding the gas producer, means for conveying steam and aspirated air to said steam chamber, and a pipe connecting said chamber to the gas producer.

4. A cooking stove adapted to create and burn artificial gas comprising a hollow column adapted to contain the fuel from which the gas is created, a closed vessel provided with means for producing air pressure therein, a steam generator extending into said column and adapted to be heated by the fire within said column, means for conveying water from the water vessel to said steam generator, a chamber arranged adjacent to said column and adapted to be heated by the fire within said column, a pipe connected to said chamber and having its outer end open to the atmosphere, a steam nozzle connected to the steam generator and arranged to direct steam into the open end of said pipe, a port placing said chamber in communication with the interior of said column, and a cooking vessel support associated with said column and arranged to contact with the gas created in said column, whereby said gas may be burnt beneath said support.

In testimony whereof I affix my signature.

Dr. OTTOKAR URBASCH.

Witnesses:
 FRIEDRICH BRINNER,
 CARL CONDENBURY.